(12) United States Patent
Freeman

(10) Patent No.: US 7,571,027 B2
(45) Date of Patent: Aug. 4, 2009

(54) KINEMATIC SINGULAR POINT COMPENSATION SYSTEMS AND METHODS

(75) Inventor: Philip L. Freeman, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 851 days.

(21) Appl. No.: 11/142,829

(22) Filed: May 31, 2005

(65) Prior Publication Data

US 2006/0271241 A1 Nov. 30, 2006

(51) Int. Cl.
*G05B 19/00* (2006.01)

(52) U.S. Cl. .............. 700/265; 700/245; 700/249; 700/259; 700/260; 700/262; 318/568.11; 318/568.16; 318/628; 318/632; 414/730; 901/3; 901/9; 901/15

(58) Field of Classification Search ........... 700/265, 700/245, 249, 259, 260, 262; 318/568.11, 318/568.16, 628, 632; 414/730; 901/3, 9, 901/15
See application file for complete search history.

(56) References Cited

U.S. PATENT DOCUMENTS

| | | | |
|---|---|---|---|
| 4,975,856 A | 12/1990 | Vold et al. | |
| 4,989,152 A * | 1/1991 | Cheng | 700/182 |
| 5,655,423 A | 8/1997 | Nishio et al. | |
| 5,815,902 A | 10/1998 | Osterried et al. | |
| 5,842,393 A | 12/1998 | Nagel | |
| 6,298,758 B1 | 10/2001 | Wu | |
| 6,317,651 B1 | 11/2001 | Gerstenberger et al. | |
| 6,323,863 B1 * | 11/2001 | Shinagawa et al. | 345/441 |
| 6,519,860 B1 * | 2/2003 | Bieg et al. | 33/503 |
| 6,637,302 B2 | 10/2003 | Miyano | |
| 6,738,691 B1 * | 5/2004 | Colgate et al. | 700/245 |
| 6,845,295 B2 * | 1/2005 | Cheng et al. | 700/245 |
| 6,978,193 B2 * | 12/2005 | Kamon et al. | 700/245 |
| 7,130,718 B2 * | 10/2006 | Gunnarsson et al. | 700/254 |

OTHER PUBLICATIONS

Quinn, The Newton Raphson Algorithm for Function Optimization, 2001, Internet, p. 1-6.*

El-Arini, Decoupled power flow solution method for well-conditioned and ill-conditioned power systems, 1992, Internet, p. 1-4.*

Surdilovic et al., Singularity Avoidance and Control of New Cobotic Systems with Differential CVT, 2004, IEEE, p. 715-720.*

Cheng et al, "Analysis and Resolution of Singularities for a 5-DOF Gryphon Manipulator", 1995 IEEE Intl Conf on Systems, Man and CYbernetics, Oct. 22-25, 1995, vol. 5, pp. 4416-4421.

Lee et al, "Kinematic and Dynamic Analysis of a Double Parallel Manipulator for Enlarging Workspace and Avoiding Singularities", IEEE Transactions on Robotics and Automation, vol. 15, No. 6, Dec. 1999, 11 pages.

(Continued)

*Primary Examiner*—Khoi Tran
*Assistant Examiner*—McDieunel Marc

(57) ABSTRACT

Kinematic singular points in a process system are handled. In one embodiment, a numerically controlled (NC) processing system includes materials processing installation having a multi-axis kinematic linkage operable to position a tip portion of the linkage along a predetermined process path. The system also includes a processor having a compensation system operable to detect a singular point in the process path and to improve the accuracy tip portion positioning near the singular point.

8 Claims, 4 Drawing Sheets

OTHER PUBLICATIONS

Oetomo et al. "Singularity Robust Manipulator Control using Virtual Joints", Proceedings of the 2002 IEEE Intl Conf on Robotics and Automation, May 11-15, 2002, vol. 3, 6 pages.

PCT International Search Report and Written Opinion for Application No. PCT/US2006/021081, dated Nov. 29, 2006, 15 pages.

* cited by examiner

KINEMATIC SINGULAR POINT COMPENSATION SYSTEMS AND METHODS

GOVERNMENT LICENSE RIGHTS

This invention was made with Government support under contract number F33615-99-2-5215 awarded by the United States Air Force. The government has certain rights in this invention.

FIELD OF THE INVENTION

This invention relates generally to multi-degree of freedom machining and positioning processes, and, more specifically, to systems and methods of handling kinematic singular points when applying software positioning compensation in a process path.

BACKGROUND OF THE INVENTION

Many machining and forming processes are presently performed using machine tools that operate under numerical control (NC). In a typical NC machine installation, a set of programmed instructions is processed by a machine tool unit (MTU) that provides motion control signals to servomechanisms coupled to the machine tool installation. A work piece retained by the machine tool installation is thus formed into a finished part according to the processed instructions. The instructions are typically prepared by machine tool programmers who develop the instructions based upon available geometrical information for the finished part, which generally includes drawings of the part, either in paper or electronic form. The machine tool programmers also typically include process-related instructions, which may include feed rates for the work piece and even the selection of one or more forming tools such as drills, end mills, or other forming tools that are driven by the NC machine. The programmed instructions are generally encoded on a variety of transportable memory devices, which may include punched tapes, magnetic tapes or disks, optical disks, or even semiconductor memory devices, such as flash memory devices. The programmed instructions are then introduced to the MTU from the transportable memory device using a reader configured to read the transportable memory device.

The machine tool installation includes an articulated mechanism operable to move a machine tool relative to a predetermined set of coordinate axes. The articulated mechanism generally includes a plurality of interconnected kinematic joints, which may be either prismatic or rotational, that cooperatively position a machine tool relative to the work piece in a coordinated fashion. The complexity of the articulated mechanism depends upon the positional capability of the mechanism, as expressed in the number of coordinate axes (i.e. the "degrees of freedom") that the mechanism exhibits. For example, in the well-known five-axis machine tool installation, the articulated mechanism is capable of translation in three mutually orthogonal directions, and is also capable of rotation about two rotational axes.

Under certain kinematic conditions, however, a movement imparted to one or more of the kinematic joints may fail to result in a desired movement of the machine tool relative to the workpiece, so that a decrease in the degrees of freedom present in the articulated mechanism occurs. Accordingly, the set of joint positions has positioned the machine tool at a singular point. For example, if the machine tool is an end mill, and the end mill is approximately aligned with a kinematic joint that is rotational then no movement imparted to the rotary joint is capable of changing the position of the end mill. In certain instances, relatively large excursions of the machine tool may occur along the singular axis while the machine tool is close to a singular point, which may damage the work piece and/or the machine tool installation.

In order to avoid encountering one or more singular points during a machining process, the process steps are generally sequentially planned by the machine programmer so that the machine tool does not encounter a singular point. Although this is an effective technique, known singular points may not be avoidable depending upon the machine tool installation and/or the work piece configuration. Moreover, in cases where the singular point is avoidable, the sequential plan may be excessively time consuming, which increases the production costs of the work piece.

Machines are typically specified and built to achieve a particular volumetric accuracy necessary to properly execute the intended process or job. For example, a machined part may have a surface location tolerance of +/−0.010". It would then be necessary for the machine to be able to position the tool tip to better than +/−0.010" within the working volume. There are two methods to achieve this.

One method is to build the machine with enough precision that the programming instructions to drive the machine assume that the machine is perfect. In this case, the positioning errors of the machine depend on how close to perfect the real machine is. To ensure that the machine is sufficiently close to perfect to meet the required tolerances, significant time and money must be spent when building the machine. Often this involves purchasing more expensive precision components, and making several measurements and mechanical adjustments to the machine during the construction and installation.

The other method is to build the machine without trying to make it close to perfect. Then, using standard metrology methods such as tracking laser interferometers, measure the "as built" condition of the machine. The difference between the as built machine and the perfect machine is then used to change the programming instructions so that the machine positions the tool within the specified tolerance. Because this allows the machine to be built with significant deviation from the perfect machine, much less time and money can be spent on construction and installation of the machine. This method of accuracy improvement is called software compensation, or command update.

However, when the machine is at or near a singularity, it will be difficult or impossible to calculate a command update to the programming instructions that improves the positioning accuracy of the tool tip without causing a large motion of the singular axis. This is undesirable because large axis motions may not be achievable in the time allocated to the move, and further may cause damage to the part or the machine. The solution is to sacrifice some accuracy for the sake of small changes to the program instruction.

In one known method, a software-based optimization program is used, that generally effects a trade-off between accuracy and joint position so that accuracy is compromised in order to maintain small joint motions. One disadvantage of this method is that the accuracy trade-off occurs even when the machine tool installation is not close to a singularity. Another disadvantage is that the method is computationally cumbersome, so that excessive computational times may be required.

What is needed are systems and methods for handling singularities in materials processing systems that employ software compensation that overcome the disadvantages of prior art systems, and are not computationally burdensome.

SUMMARY

The present invention comprises systems and methods for handling kinematic singular points during software compensation in a process path. In one aspect, a numerically controlled (NC) processing system includes a materials processing installation having a multi-axis kinematic linkage operable to position a tip portion of the linkage along a predetermined process path. The system also includes a processor having a compensation system operable to detect a singular point in the process path and to improve the accuracy tip portion positioning in both location and orientation near the singular point.

BRIEF DESCRIPTION OF THE DRAWINGS

The embodiments of the present invention are described in detail below with reference to the following drawings.

DETAILED DESCRIPTION

The present invention relates to systems and methods of compensating for kinematic singular points in a process path. Many specific details of certain embodiments of the invention are set forth in the following description and in FIGS. 1 to 5 provide a thorough understanding of such embodiments. One skilled in the art, however, will understand that the present invention may have additional embodiments, or that the present invention may be practiced without one or more of the details described in the following description.

Figure 1:
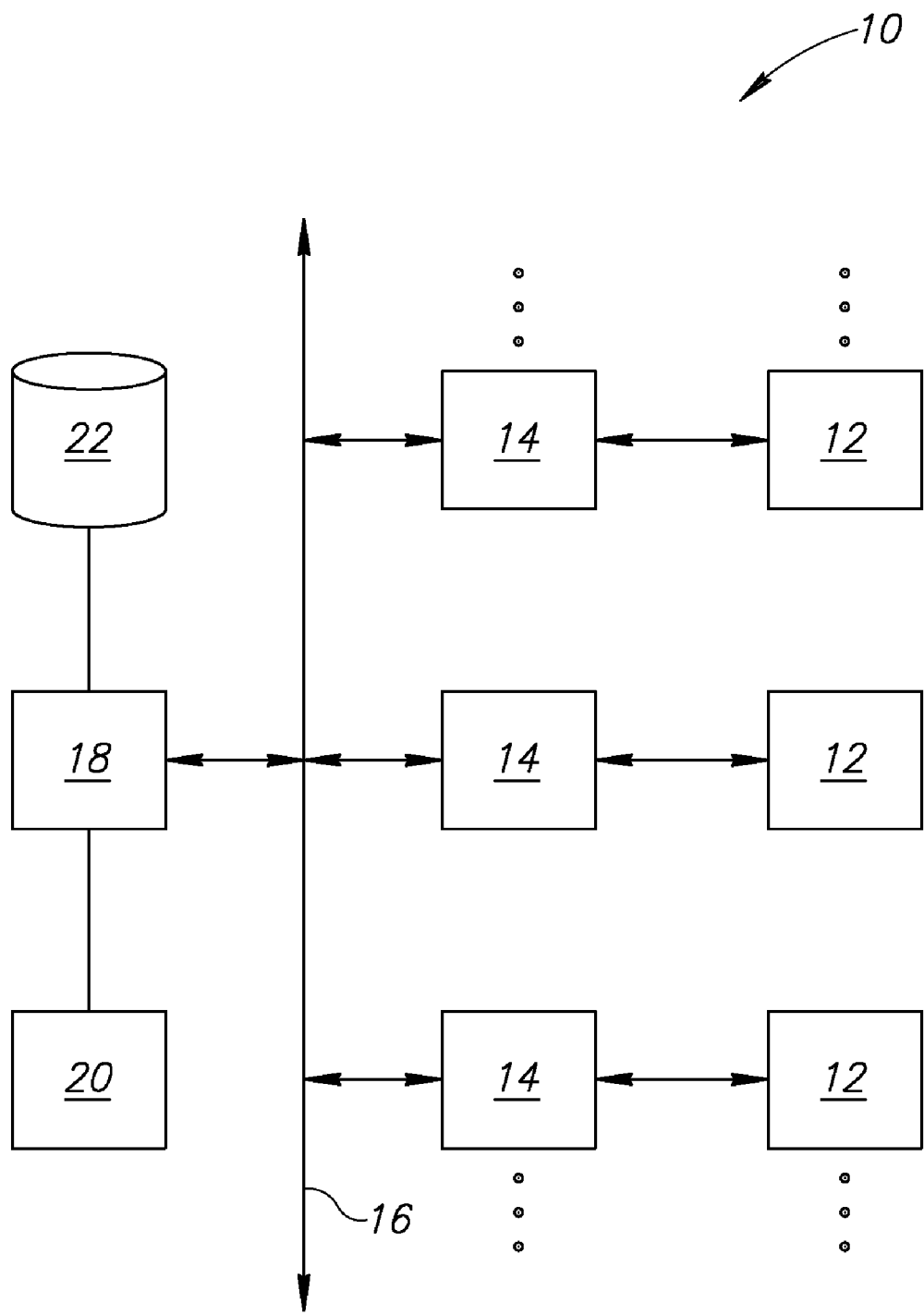
FIG. 1 is a block diagrammatic view of a numerically controlled (NC) processing system according to an embodiment of the invention.

FIG. 1 is a block diagrammatic view of a numerically controlled (NC) processing system 10 according to an embodiment of the invention. The system 10 includes one or more materials processing installations 12. In the following discussion, "materials processing installation" will be understood to represent a device capable of performing a process on a work piece retained by the installation. Accordingly, the material process installation may include a machine tool installation that is configured to perform multi-axis machining operations on the work piece. Alternately, the material process installation may also include other multi-axis devices capable of component placement, such as a numerically controlled assembly robot.

In a specific embodiment of the invention, each materials processing installation 12 includes a multi-axis computer numerically controlled (CNC) machine tool installation operable to perform milling, boring, shaping or positioning operations on a work piece. Accordingly, each installation 12 is operable to position and control a tip portion along a predetermined process path. For example, the tip portion may be a spindle mechanism (not shown in FIG. 1) that is configured to removably retain various cutting tools. Each installation 12 may also include a generally movable worktable (also not shown in FIG. 1) that supports the work piece.

Briefly, and in general terms, a multi-axis installation typically includes one or more open kinematics chains having a sequence of elements or links that are coupled by kinematic joints that provide one of a rotation and a linear degree of freedom in translational motion. An element of the installation is driven along a corresponding guide element by a suitable drive apparatus, such as an electric motor or other similar devices. As the element is driven, it may affect the position of other kinematic links coupled to the driven element. Typically, the multi-axis CNC machine tool installation is a "five-axis" machine tool installation that is operable to move the spindle mechanism along three translational axes and about two rotational axes. An example of a suitable five-axis CNC machine tool installation is the T-30 CNC machining center, available from Cincinnati Milacron, Inc. of Cincinnati, Ohio, although other suitable alternatives exist.

As further shown in FIG. 1, the NC processing system 10 also includes one or more process data transmission units 14. The process data transmission unit 14 is operable to accept machine tool instructions received from a communications system 16, and to generate "high level" instructions that describe the locations of features on a work piece where a prescribed operation is to occur. In a specific embodiment, the process data transmission unit (PDTU) 14 is a machine tool data transmission unit (MTDTU) coupled to a five-axis machine tool installation. The communications system 16 may include an optical communications link, a metallic communications link such as a land-based telephone line, or a coaxial cable link using a cable modem, or other suitable devices. In other embodiments, the communications system 16 may include a digital subscriber line (DSL), or an integrated services digital network (ISDN). Alternately, the communications system 16 may be at least partially a wireless system that includes wireless transceivers that are physically spaced apart. In either case, the communications system 16 may also be coupled to other communications systems or networks, such as a local area network (LAN), a wide area network (WAN), or to the Internet.

Still referring to FIG. 1, the NC processing system 10 further includes a processor 18 that may include a general-purpose computer system operable to execute one or more computer programs provided to the processor 18, which may include software modules that are generally operable to monitor and control the operation of the material processing installation 12, and are further operable to adjustably compensate a position of the material processing installation 12 when the installation 12 is operating upon a work piece proximate to a singular point, as will be discussed in greater detail below. The one or more software modules may be executed under the control of an operating system (OS) that is installed in the processor 18 and that is configured to perform various tasks as requested by the one or more software modules. In a particular embodiment, the OS is capable of multi-threaded operation in that it schedules the execution of selected portions of the one or more software modules concurrently. Accordingly, the OS may be the WINDOWS NT operating system, available from Microsoft Corporation of Redmond, Wash., although other suitable alternatives exist. For example, the OS may also include a UNIX operating system or an AIX operating system. Other selected embodiments may employ, for example, the SOLARIS operating system, available from Sun Microsystems, Inc. of Santa Clara, Calif., or the LINUX operating system, available from Red Hat, Inc. of Raleigh, N.C.

The one or more software modules may include instructions written in a higher-level language, such as the C, C++, BASIC, PASCAL, or other programming languages, that is compiled and linked to form executable segments for execution by the processor 18. The compiled portions of the one or more software modules may be stored within one or more random access memory (RAM) modules before execution by the processor 18. An input/output device 20 is coupled to the processor 18 to permit communications to occur between a user and the processor 18. Accordingly, the input/output device 20 may include a visual display terminal that allows information generated by the processor 18 to be viewed, and that also permits information to be transferred to the processor 18 by means of a keyboard, a touch screen apparatus, a mouse, a voice recognition apparatus, or other similar devices. The input/output device 20 may also include a communications port that permits communications between the processor 18 and the communications system 16, so that processed information may be exchanged between the processor 18 and the PDTU 14.

The processor 18 is also coupled to one or more mass storage devices 22 that are generally configured to store data and/or programmed instructions. The mass storage device 22 may include a magnetic disk drive that is remotely positioned relative to the processor 18. Alternately, the mass storage device 22 may include a magnetic disk drive that is positioned within the processor 18. In other specific embodiments, the mass storage device 22 may include an optical disk drive that is located either within the processor 18, or is remotely located relative to the processor 18.

Figure 2:
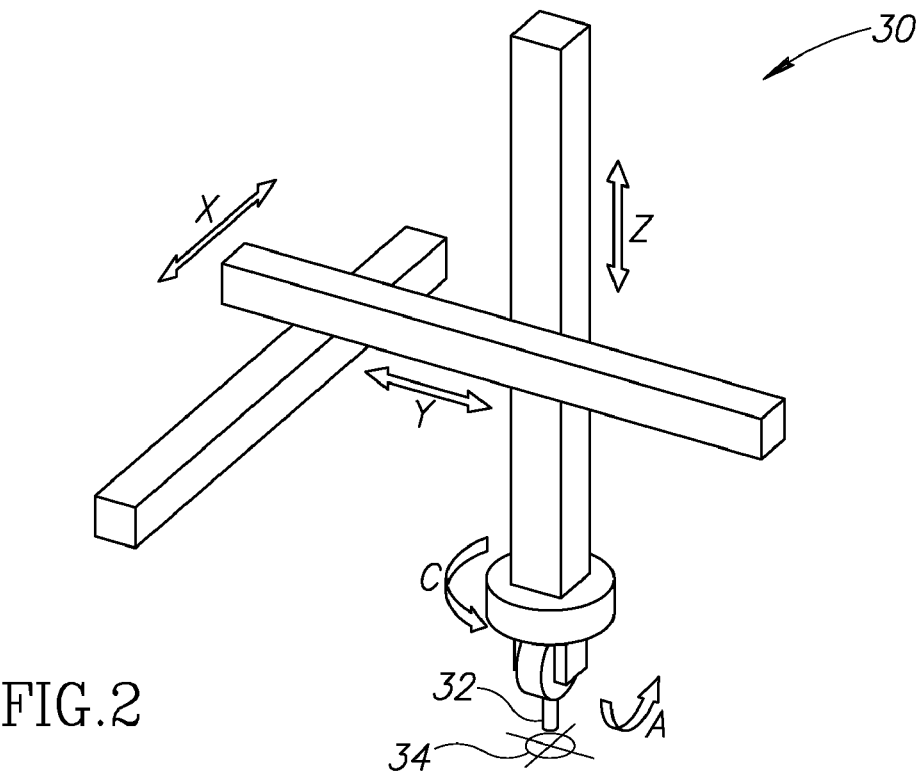
FIG. 2 is an isometric diagrammatic representation of a kinematic assembly near a singular point.

FIG. 2 is an isometric diagrammatic representation of a kinematic assembly 30 that will now be used to describe the operation of the NC processing system 10 of FIG. 1. As shown, the assembly 30 is a five-axis kinematic assembly configured to independently move a tip portion 32 relative to three linear axes (i.e., the X, Y and Z axes shown in FIG. 2) and also in two rotational directions (i.e., the A and C directions shown in FIG. 2). The tip portion 32 is presently positioned at a singular point 34 since a rotation of the tip portion 32 of the assembly 30 in the C rotational direction cannot change a position of the tip portion 32. Accordingly, the five-axis assembly 30 shown in FIG. 2 loses a "degree of freedom" when the tip portion 32 is positioned at a singular point 34.

In general, the Cartesian position and angular orientation of the tip portion 32 may be represented by a vector X that is related to a link position vector Q by a set of functions $f()$ so that $X=f(Q)$. The Jacobian of the function set $f()$ is defined as $J(Q)=(\partial x_i/\partial q_j)$, and maps the differential motions of the joints to their respective effects on the Cartesian position and orientation of the tip portion 32. If the foregoing is linearized (an approximation), then $J\Delta Q=\Delta X$ so that a change in the Cartesian position X of the tip portion 32 is related to a change in the link positions Q. As the tip portion 32 is moved close to the singular point 34, the Jacobian J(Q) becomes progressively more ill-conditioned, and when the tip portion 32 is positioned at a singularity, the Jacobian J(Q) becomes rank-deficient.

Figure 3:
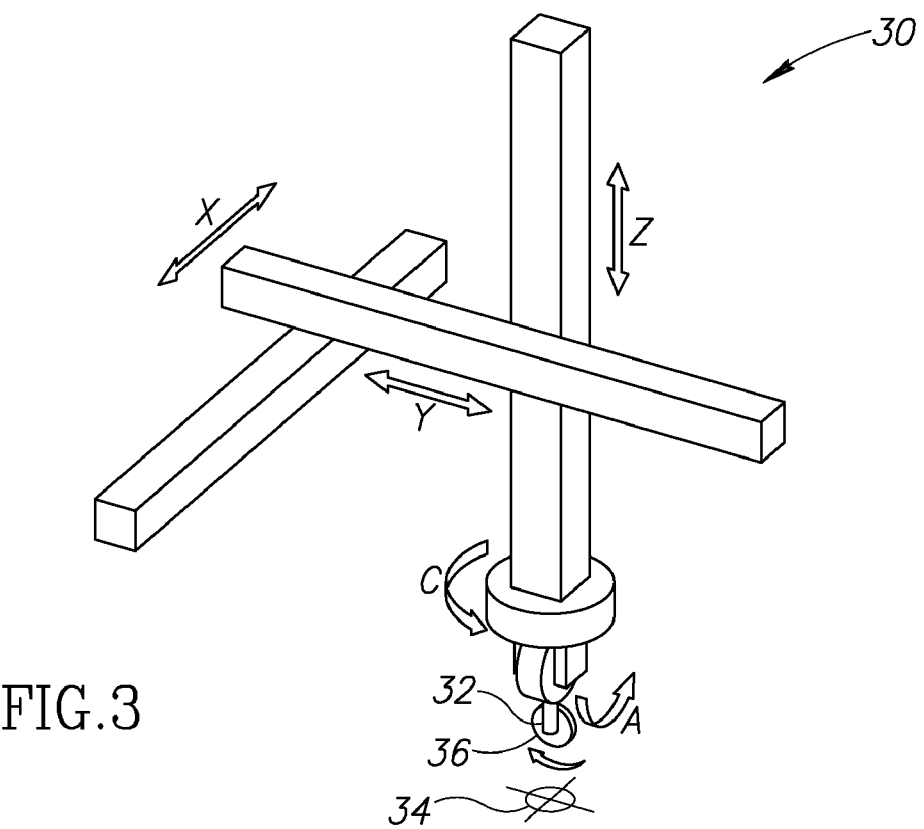
FIG. 3 is an isometric diagrammatic representation of a kinematic assembly having a virtual axis.

As will be discussed in greater detail below, and referring now also to FIG. 3, when the tip portion 32 is near the singular point 34, a virtual axis 36 is generated that is at least approximately perpendicular to the axis C and A so that the Jacobian J(Q) becomes non-singular.

Figure 4:
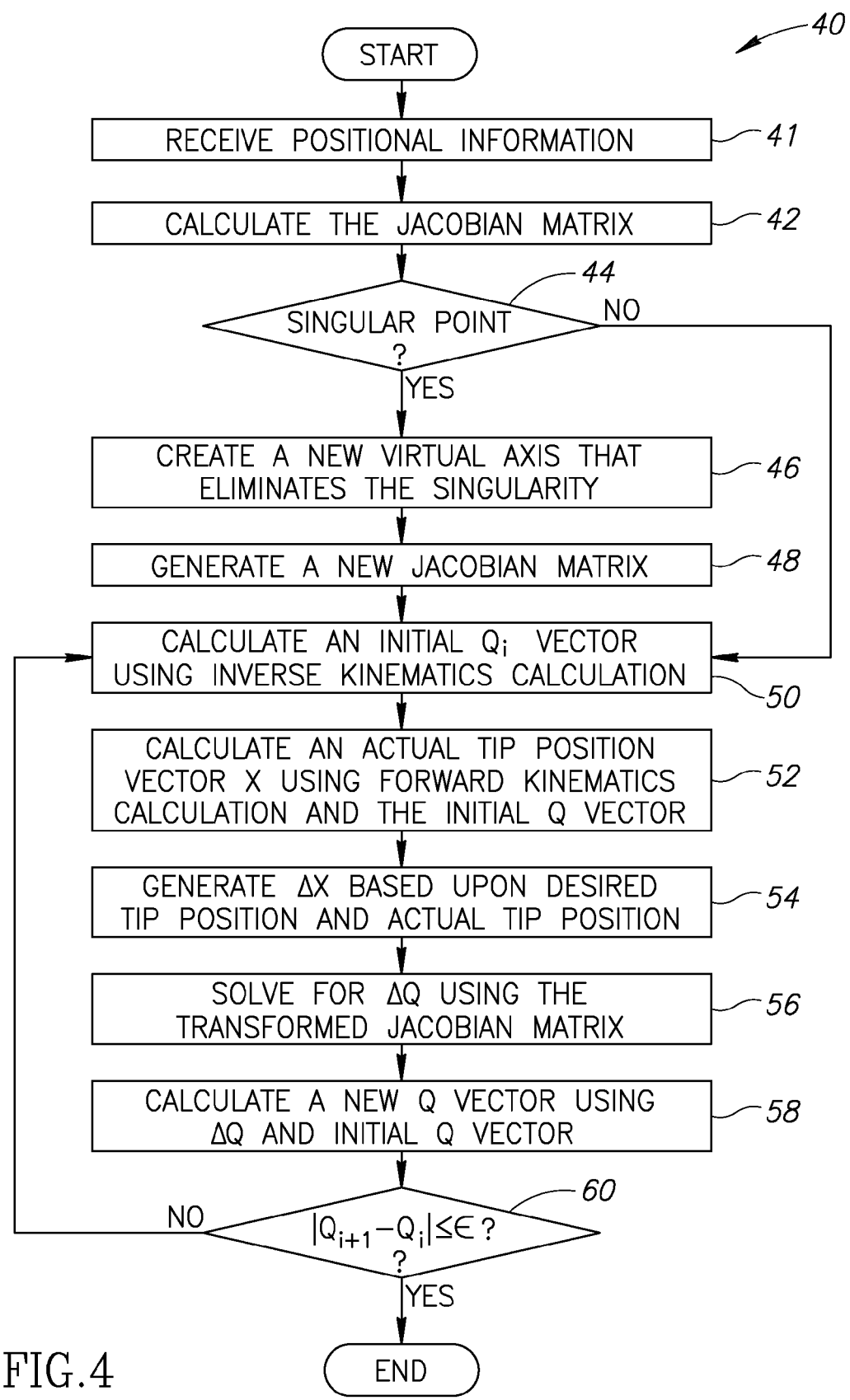
FIG. 4 is a flowchart that will be used to describe a method of handling kinematic singularities in a multi-axis materials processing installation.

FIG. 4 is a flowchart that will be used to describe a method 40 of handling kinematic singularities in a multi-axis materials processing installation, according to another embodiment of the invention. As a preliminary matter, and in the following discussion, a "forward kinematic calculation" is understood to entail a determination of a position of a kinematic assembly when the angles and distances between the links comprising the kinematic assembly are known. Accordingly, the position of the kinematic assembly may be directly calculated since geometrical information for the links is also known. In contrast, an "inverse kinematic calculation" is understood to entail determining the angles and distances between the kinematic links of the assembly when an end portion of the kinematic assembly is positioned at a selected spatial position. The inverse kinematics problem typically has a plurality of possible solutions, which must generally be determined iteratively using known methods.

At block 41, positional information is received from a trajectory planner, which will be described in further detail below. At block 42, the Jacobian matrix J(Q) is calculated. At block 44, it is determined if the tip portion 32 is near a singular point 34 (as shown in FIG. 2 and FIG. 3). The determination may be based upon the location of known singularities. Alternately, the condition of the Jacobian J(Q) may be examined using known methods. If the tip portion 32 is proximate to a singular point 34, the virtual axis 36 (as shown in FIG. 3) is generated that eliminates the singularity, as shown at block 46. The virtual axis 36 may be generated, for example, by forming a vector product between vectors that extend along the rotational axes A and C, by completing the basis for the Jacobian, or by other known means. At block 48, a new Jacobian matrix J(Q) is generated. The virtual axis 36 permits a rank-deficient row (or column) in the Jacobian matrix J(Q) of block 42 to be replaced.

Still referring to FIG. 4, at block 50, an initial $Q_i$ vector is calculated using a nominal inverse kinematics calculation. At block 52 an actual tip position vector X is calculated using an as-built forward kinematics calculation and using the initial $Q_i$ vector. A $\Delta X$ vector may then be calculated by forming a difference between a desired tip position vector and an actual tip position vector, as shown at block 54. At block 56, a $\Delta Q$ vector is calculated using the Jacobian matrix J(Q) calculated at block 48. Using the $\Delta Q$ vector calculated at block 56 and the initial $Q_i$ vector calculated at block 50, a new $Q_{i+1}$ vector is calculated at a block 58. At block 60, convergence is tested by forming an absolute difference between the $Q_{i+1}$ and the $Q_i$ vectors to determine if the absolute difference is less than or equal to a predetermined convergence criterion $\epsilon$. If the method 40 has not yet converged at block 60, the method 40 returns to block 50, and the actions represented by blocks 50 through 60 are repeated. If convergence is obtained, the method 40 ends. Further, if the method 40 is not sufficiently close to a singular point, then the method 40 branches at block 44 to block 50.

Figure 5:
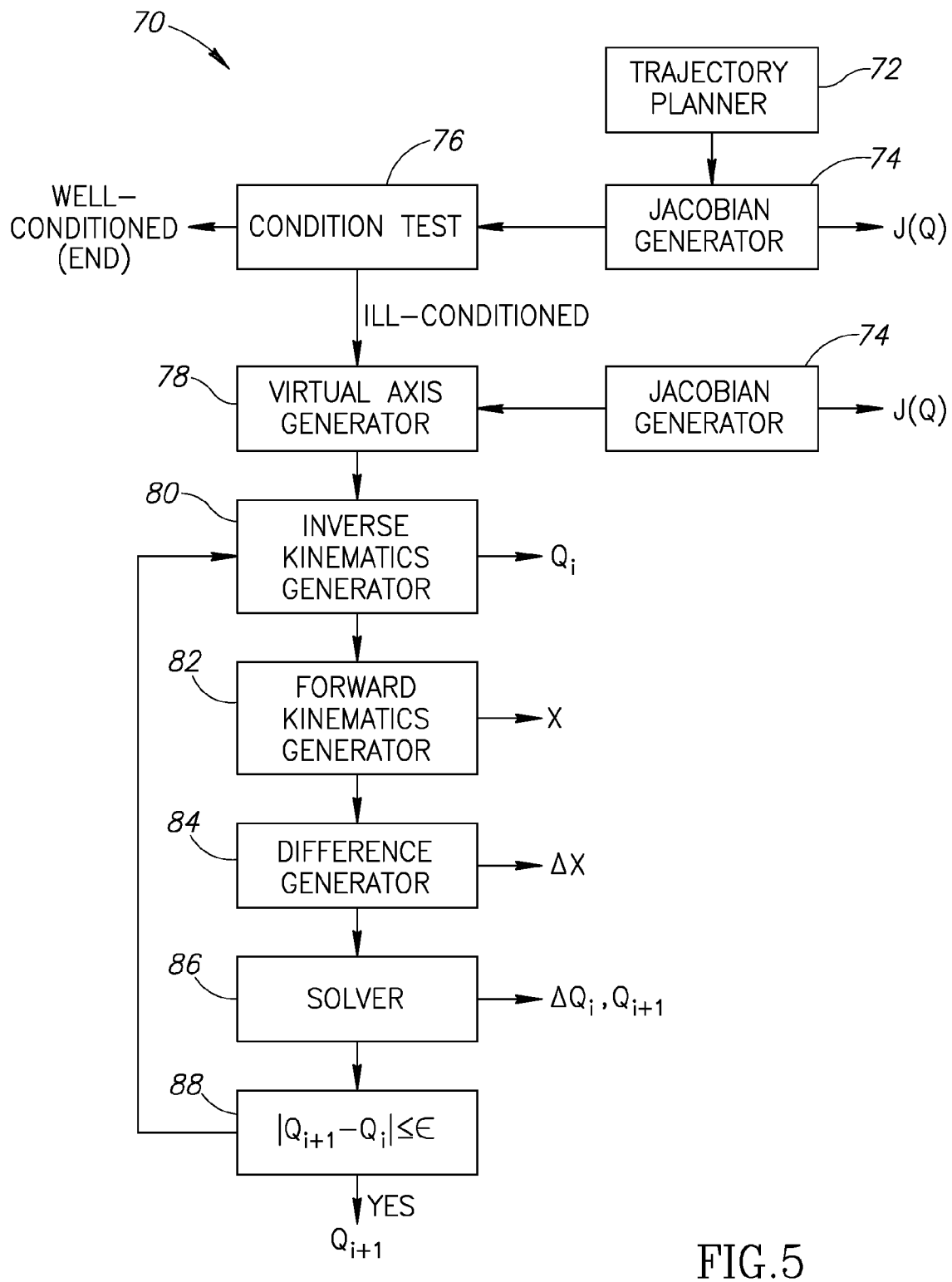
FIG. 5 is a block diagrammatic view of a software product that is configured to handle singular points in a software compensated system, according to another embodiment of the invention.

FIG. 5 is a block diagrammatic view of a software product 70 that is configured to handle singular points in a software compensated NC processing system, according to another embodiment of the invention. The software product 70 includes a trajectory planner 72 that calculates a vector of kinematic joint positions that the machine executes as the tip portion 32 (as shown in FIG. 2 and FIG. 3) moves along a prescribed path. In general, the vector is compared to the as-built kinematics of the machine. A difference between an actual position and orientation of the tip portion 32 and an ideal position of the tip portion 32 is calculated, which represents an error vector associated with a position of the tip portion 32. A corrected positional vector for the tip portion 32 may then be calculated that reduces the joint offset vector. For each of the corrected positions generated, the Jacobian J(Q) is calculated by calling a Jacobian generator module 74 that calculates the Jacobian matrix.

The condition of the Jacobian J(Q) is determined at a condition test module 76. If the Jacobian J(Q) is well-conditioned (i.e., not rank deficient) the software product 70 accepts the Jacobian J(Q) to control of the movement of the kinematic elements. If the Jacobian J(Q) is ill-conditioned, a virtual axis generation module 78 constructs a virtual axis that avoids the singularity, and a new Jacobian J(Q) is calculated by calling the Jacobian generator module 74, so that a new Jacobian J(Q) is calculated that does not include the rank-deficient row or column in the Jacobian J(Q). An inverse kinematics generation module 80 then generates an initial $Q_i$ vector. A forward kinematics generation module 82 calculates an actual tip position vector X corresponding to the initial $Q_i$ vector. A difference generation module 84 then calculates a $\Delta X$ vector by forming a difference between a desired tip position vector and an actual tip position vector. A solver module 86 is operable to generate a $\Delta Q$ vector using the Jacobian matrix J(Q) calculated in the Jacobian generator module 74, and a new vector $Q_{i+1}$ is generated. In one embodiment, a Newton-Raphson algorithm may be used. A comparison module 88 determines if the product 70 has achieved convergence. If the module 88 determines if the difference is less than or equal to a predetermined convergence criterion $\epsilon$, then the product 70 returns the value $Q_{i+1}$. If convergence is not obtained, then the product returns to the inverse kinematics generator 80.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of handling kinematic singularities in a multi-axis materials processing installation, comprising using a processor to:

receive positional information describing a materials process path for a tip portion of the multi-axis installation;

determine if the tip portion is proximate to a singular point in the process path by identifying a singular axis; and if the tip portion is proximate, generate a virtual axis that is approximately perpendicular to the singular axis.

2. The method of claim 1, wherein receiving positional information further comprises receiving the information from a trajectory planner.

3. The method of claim 1, wherein determining if the tip portion is proximate to a singular point further comprises generating a Jacobian matrix and determining if the Jacobian matrix is relatively ill-conditioned.

4. The method of claim 1, wherein generating a virtual axis further comprises generating a Jacobian matrix that is relatively well-conditioned.

5. The method of claim 4, wherein generating a Jacobian matrix that is relatively well-conditioned further comprises calculating a vector that includes initial link positions using an inverse kinematics calculation.

6. The method of claim 5, wherein calculating a vector that includes initial link positions using an inverse kinematics calculation further comprises calculating an actual tip position vector using a forward kinematics calculation and the vector that includes initial link positions.

7. The method of claim 6, wherein calculating an actual tip position vector further comprises generating a positional difference vector based a desired tip position and the actual tip position vector, and generating a vector that includes link position differences.

8. The method of claim 7, wherein generating a positional difference vector based a desired tip position and the actual tip position vector, and generating a vector that includes link position differences further comprises calculating a vector that includes new link positions using the vector that includes link position differences and the vector that includes initial link positions.

* * * * *